June 7, 1949.    A. RASPET    2,472,759
THERMOPILE FOR MEASURING AIR TEMPERATURES
Filed May 3, 1945
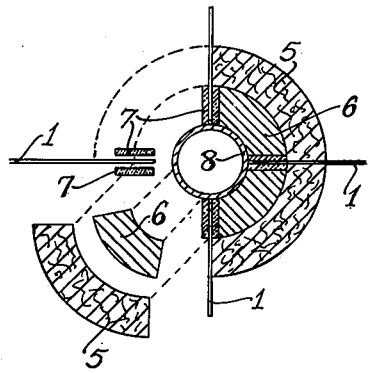
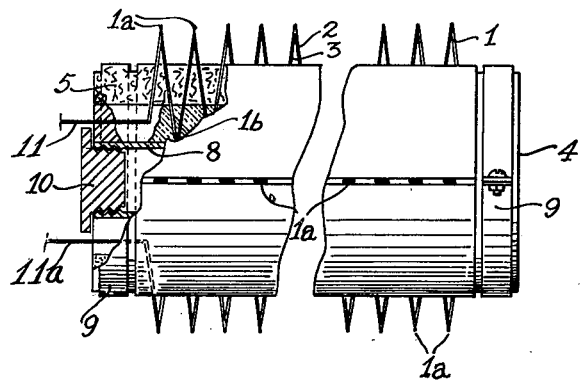
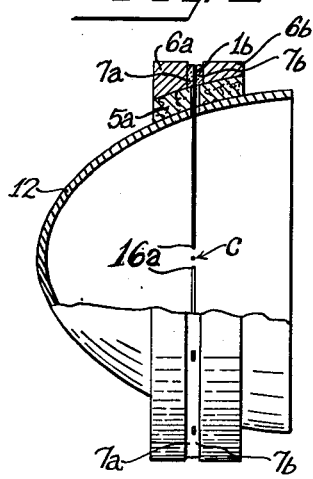
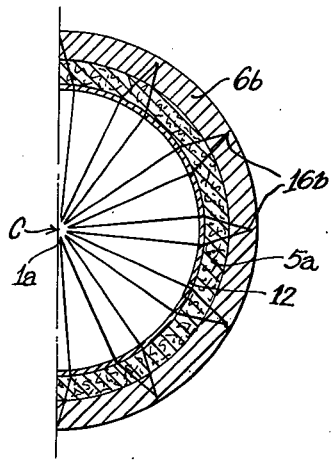
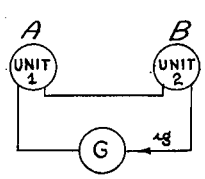
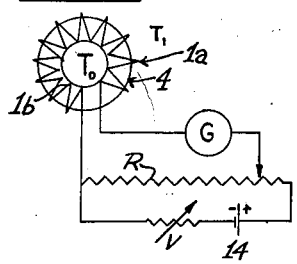
INVENTOR.
AUGUST RASPET
BY Worth Wade
Attorney Patented June 7, 1949

2,472,759

UNITED STATES PATENT OFFICE 2,472,759

THERMOPILE FOR MEASURING AIR TEMPERATURES

August Raspet, Locust Valley, N. Y.

Application May 3, 1945, Serial No. 591,721

1 Claim. (Cl. 136—4)

This invention relates in general to an apparatus for measuring temperature and, in particular, to a thermoelectric thermometer adapted for use in the measurement of heat flow, radiation and stellar temperatures, and to correlated improvements designed to enhance the sensitivity and utility of such apparatus.

It is a general object of the present invention to provide a thermoelectric thermometer which will be characterized by high sensitivity, maximum deflection, low internal resistance and a small thermoelectric lag.

It is another object of the invention to provide a portable thermoelectric thermometer which will be smaller in size and have less weight than prior devices heretofore known.

Other objects of the invention will in part be obvious and will in part appear hereinafter.

According to the present invention, there is provided a thermoelectric thermometer comprising, in combination, a thermopile comprising a plurality of junctions of dissimilar metals closely spaced together and connected in series, a thermal capacity comprising a block of metal of high specific heat, alternate junctions in such series being in an exposed position and the remaining junctions being positioned in close proximity to said thermal capacity. The present invention also comprises as shown in Fig. 4 a circuit consisting of two of the thermoelectric thermometers A and B just described connected in series but bucking each other and positioned at spaced distances, with means for measuring the voltage generated in such circuit such as the galvanometer G. When one of such thermopiles is exposed to the atmosphere of which the temperature is to be measured, and the other is exposed at a spaced point to a different temperature condition, it is possible to measure the relative difference in temperatures between the spaced points.

For a more complete understanding of the nature and objects of the invention, reference should be had to the accompanying drawing in which:

Fig. 1 is an end elevation, in section, of one embodiment of the present thermometer;

Fig. 2 is a side elevation, partly in section, of the device shown in Fig. 1;

Fig. 3 is a side elevation, in section, of one embodiment of a thermoelectric thermometer for measuring the temperature of radiation;

Fig. 4 is a cross-section of the device of Fig. 3 taken along the line 6—6 thereof;

Fig. 5 is a representation of a suitable electrical circuit for using the device of the present invention as a thermoelectric gradiometer, and Fig. 6 is a circuit suitable for using the device as a reference thermometer.

In the construction of the thermopiles, any dissimilar wires may be employed. In the following table there are listed a few thermojunctions and their thermoelectric power:

| | Microvolts/° C. |
|---|---|
| Copper-nickel | 22 |
| Copper-constantan | 40 |
| Iron-constantan | 55 |
| Chromel-constantan | 65 |
| Chromel-Copel | 75 |
| Bismuth-antimony | 115 |

In the now preferred embodiment of the invention, there is employed Chromel-constantan junctions because Chromel has about 1/40 thermal conductivity of copper and such thermocouples have an E. M. F. of about 65 microvolts per degree C. as compared to 40 microvolts per degree C. for a copper-constantan junction. In general, the smaller the wire and the better the contact of the co-junction, the lower the lag.

It is immaterial in the device of the present invention what shape or configuration is given to the series of multiple thermojunctons. For example, the thermojunctions may be connected in series and arranged in a common plane and in a straight line as shown in Figs. 1 and 2. Alternatively, they may be in a common plane but disposed so that the outer junctions describe a circle while the alternate junctions lie along a smaller circle in the interior as shown in Figs. 3 and 4. Generally speaking, it is desirable to have one set of alternate junctions arranged so that they can be exposed to an atmosphere the temperature of which is to be measured, while the other junctions are insulated from such atmosphere and are also in good contact with a cooling means or a block of metal having a high specific heat.

The insulating material 5 or 5a may be any suitable material of high dielectric such, for example, as glass, rubber, asbestos, balsa wood, formed synthetic resin, or other cellular, porous, or fibrous material.

Without limiting the invention, there will now be described three embodiments. Referring to Fig. 1, there is shown an embodiment suitable for measuring the temperature of gaseous atmospheres and comprising a multiplicity of thermojunctions 1 formed by joining dissimilar wires 2 and 3, alternate junctions being arranged on one side in an evenly spaced relation and the remaining junctions lying evenly spaced on the other side of the layer of insulating material such as glass, asbestos or rubber. It should be noted from Fig. 1 that all of the junctions are connected in series, and the wires 11 and 11a lead to a sensitive galvanometer. To increase the sensitivity there is preferably employed a strip or block 6 of metal such as copper having a high specific heat, and one set of the thermojunctions is brought into proximity to this block but is insulated therefrom by means of thin sheets 7 of glass or mica. If the block 6 is cooled, for example, maintained at zero, and the other series of junctions are exposed to the atmosphere, the maximum efficiency will be established in the thermopile.

To increase the overall output, a plurality of the units illustrated in Fig. 1 may be grouped together into a single unit as illustrated in Fig. 2 in which the thermo-junctions 1a, formed by welding together dissimilar metal wire 2 and 3, are exposed on the surface of a cylindrical unit 4 comprising an outermost layer 5 of insulating material and a second layer comprising a series of segmented arcuate blocks 6 of metal, the enclosed junctions being insulated from the metal blocks by thin sheets 7 of mica. The blocks 6 contact and surround a cylindrical metal container 8 preferably made of aluminum, steel or other light metal and provided with a screw plug 10, which container is adapted to be packed with ice or to be cooled by passing a cold liquid or gas therethrough. The outer junctions 1a are exposed while the inner junctions 1b are positioned in close proximity to but do not touch the container 8. The segments comprising the unit 4 shown in Fig. 1 may be held together in their proper position as shown in Fig. 2 by means of a metal band 9 which encircles the ends of the layer 5. The unit shown in Fig. 2 is especially adapted for measuring temperature gradients in gaseous atmospheres, two of such units A and B being connected in opposite series with a sensitive galvanometer G as shown in Fig. 5. When unit A is placed in the area to be measured and B is in another area, the galvanometer will register the difference in the temperature between A and B.

That embodiment shown in Figs. 3 and 4 is especially designed for measuring the temperature of radiation, either infra-red, visible, or ultraviolet. In this embodiment there is provided suitable means for focusing radiation at a predetermined point indicated at C such, for example, as a parabolic reflector 12. The thermopile is circular in shape and so arranged that the exposed junctions 16a are positioned in close proximity to the joint C while the alternate junctions 16b pass through the parabolic reflector and are held between the metal rings 6a and 6b insulated therefrom by means of the mica rings 7a and 7b. A layer 5a of insulating material separates the metal rings 7a from the reflector 12. In this embodiment the radiation is focused at the point A about which the exposed thermocouples are arranged so that the maximum heating effect is obtained. The junctions which are enclosed in the rings 7a and 7b may be cooled by means of a suitable refrigerant brought into contact with the blocks 7a.

In one use of the device of the present invention, as shown in Fig. 5, two of the units A and B described in any of the embodiments are positioned at spaced points in an atmosphere or in the radiation field, and the two units are connected in opposite series with a sensitive galvanometer G which gives a direct reading of the temperature differential or gradient between the points.

In Fig. 6 there is shown a suitable circuit when using the unit as a thermoelectric gradometer, that is, a device to measure temperature gradings. The unit is disposed so that the junctions 1a are exposed to the temperature $T_1$ which is to be measured, while the inner junctions 1b are exposed to the reference temperature $T_0$, such as the temperature of melting ice. The thermopile is then connected in series with a galvanometer G and to one end of a rheostat R. The other side of the rheostat is connected in series with a variable resistance V and a battery 14. Thus, in effect, a balanced bridge circuit is produced so that the current generated in the branch comprising the unit 4 and the galvanometer G may be balanced by the current from the battery 14.

Accordingly, the device of the present invention is particularly adapted for measuring temperature gradients in the atmosphere and in the study of air flow phenomena, also for measuring the temperature in continuous driers for the evaporation of solvents or the curing of ceramics, and other industrial purposes, also for measuring the temperature differential in air conditioning systems of all kinds, for measuring heat flow in hot air systems, for measuring thermal radiation from conductors of all types, and for measuring radiation temperatures, whether artificially created or generated in the stellar atmosphere. Owing to the multiplicity of closely spaced thermocouples and the fact that these thermocouples are arranged in series, a higher efficiency is obtained than with any prior device. The devices of the present invention are also characterized by simplicity, small bulk, low weight, freedom from the necessity of computing, and by exhibiting a low lag.

Having described my invention, what I claim as new and desire to secure by Letters Patent is:

A free-air thermometer adapted to measure the temperature of an air stream, comprising, in combination, a cylindrical metal chamber adapted to hold a refrigerant, arcuate sections of a metal of high specific heat mounted on the surface of said chamber so as to substantially surround the chamber, corresponding arcuate sections of an insulating material mounted on the outer surface of said arcuate sections of metal, a plurality of multi-junction thermopiles corresponding in number to the arcuate sections of metal of high specific heat, said thermopiles being positioned longitudinally of said refrigerating chamber and disposed between the arcuate sections with alternate junctions closely adjacent to but insulated from the said arcuate sections of metal and the other junctions extending outside said insulating material so that they will be exposed to an air stream the temperature of which is to be measured.

AUGUST RASPET.

REFERENCES CITED

The following references are of record in the file of this patent:

UNITED STATES PATENTS

| Number | Name | Date |
| --- | --- | --- |
| 1,077,219 | Coblentz | Oct. 28, 1913 |

(Other references on following page)

UNITED STATES PATENTS

| Number | Name | Date |
|---|---|---|
| 1,639,412 | Mechau | Aug. 16, 1927 |
| 1,818,221 | Huber | Aug. 11, 1931 |
| 2,076,211 | Straatman | Apr. 6, 1937 |
| 2,141,453 | Schmidt | Dec. 27, 1938 |
| 2,304,489 | Wetzel | Dec. 8, 1942 |
| 2,357,193 | Harrison | Aug. 29, 1944 |
| 2,393,196 | Schwarz | Jan. 15, 1946 |
| 2,432,145 | Evans | Dec. 9, 1947 |

FOREIGN PATENTS

| Number | Country | Date |
|---|---|---|
| 406,453 | Great Britain | 1934 |
| 761,973 | France | Jan. 13, 1934 |

OTHER REFERENCES

Houghten et al.: Trans. Am. Soc. Heat. and Vent. Engrs., vol. 33 (1932), pp. 239, 240.

Gould, K. E.: J. Opt. Soc. Am., vol. 17 (1928), p. 201.